United States Patent [19]
Inomata et al.

[11] Patent Number: 5,986,844
[45] Date of Patent: Nov. 16, 1999

[54] PLAYBACK SPEED CONTROL SYSTEM FOR A REPRODUCING APPARATUS

[75] Inventors: Naoki Inomata; Toshiyuki Shirasu, both of Kanagawa, Japan

[73] Assignee: Sony Corporation, Tokyo, Japan

[21] Appl. No.: 08/113,701

[22] Filed: Aug. 31, 1993

[30] Foreign Application Priority Data

Sep. 4, 1992 [JP] Japan ................................. 4-236992
Nov. 2, 1992 [JP] Japan ................................. 4-294650

[51] Int. Cl.$^6$ .................................................. G11B 15/467
[52] U.S. Cl. ..................................... 360/73.08; 360/73.05
[58] Field of Search ........................... 360/73.08, 73.05, 360/71, 10.3

[56] References Cited

U.S. PATENT DOCUMENTS 4,139,872  2/1979  Tachi .................................. 360/10.3 X
4,161,001  7/1979  Sakamoto ............................. 360/10.3

FOREIGN PATENT DOCUMENTS 0 188 162  7/1986  European Pat. Off. .
0 198 658  10/1986  European Pat. Off. .
2 358 071  2/1978  France .
1 568 877  6/1980  United Kingdom .

OTHER PUBLICATIONS

Patent Abstracts Of Japan vol. 16, No. 80 (P–1318) Feb. 26, 1992 & JP–A–03 268 258 (Sony Corp.) Nov. 28, 1991.
Patent Abstracts Of Japan vol. 16, No. 216 (P1356) May 21, 1992 & JP–A–04 038 743 (Matsushita Electric Ind. Co. Ltd) Feb. 7, 1992.

Primary Examiner—Aristotelis M. Psitos
Assistant Examiner—James L Habermehl
Attorney, Agent, or Firm—Frommer Lawrence & Haug, LLP.; William S. Frommer

[57] ABSTRACT

A playback speed control system for a reproducing apparatus allows a user to manually vary the playback speed of a recording medium. When a user rotates a dial of the reproducing apparatus, a frequency generator generates pulses with a frequency that matches the rotational speed of the dial. A counter counts these generated pulses within a specified time period. In one embodiment, the recording medium speed is kept constant over a particular range of dial rotational speeds, while outside this range, the tape speed varies in accordance with the dial rotational speed. In another embodiment, if the value of the count data exceeds a reference value, then these pulses are averaged, and the averaged result is used to determine the speed of the recording medium. If the count data value is less than the reference value, then this count data is used to determine the speed of the recording medium. In yet another embodiment, the generated pulses are averaged in accordance with one of a plurality of averaging techniques. The particular averaging technique is selected in accordance with a comparison between the count data value and a plurality of reference values. Each consecutive pair of reference values defines a particular range. Each range corresponds to a particular averaging technique, and when a count data value falls within a particular range, then the pulses are averaged in accordance with the averaging technique that corresponds to that particular range.

18 Claims, 10 Drawing Sheets

PLAYBACK SPEED CONTROL SYSTEM FOR A REPRODUCING APPARATUS

BACKGROUND OF THE INVENTION

The present invention relates to a playback speed control system for a reproducing apparatus which is applicable to control a playback speed of a VTR, for example.

It has been known in a conventional VTR that a playback speed is controlled in accordance with a rotational speed of a dial which is called a jog dial.

Figure 1:
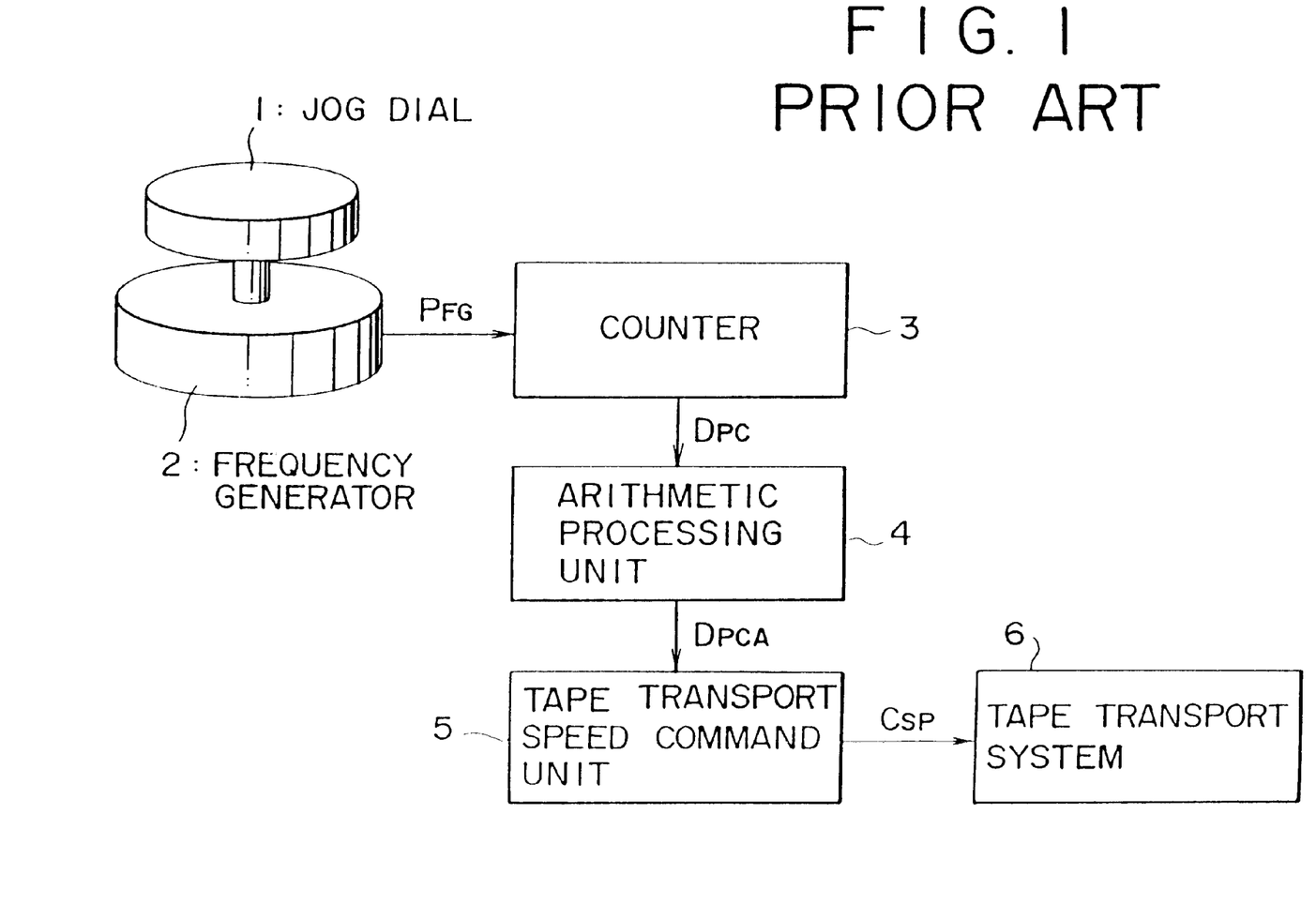
FIG. 1 is a block diagram showing a construction of prior art.

FIG. 1 shows an example of a playback speed control system for a conventional VTR. In FIG. 1, reference numeral 1 is a jog dial. Reference numeral 2 is a frequency generator mounted on a rotational axis of dial 1. In a conventional way, frequency generator 2 optically or magnetically generates pulses (FG pulses) P FG whose frequency corresponds to a rotational speed of dial 1.

Pulses P FG generated by frequency generator 2 are supplied to a counter 3 and are counted thereby in a certain period. Count data D PC obtained from counter 3 is supplied to an arithmetic processing unit 4 and is averaged by integration calculation thereby.

When a man rotates dial 1 in order to keep a constant playback speed, fluctuation of the rotational speed of dial 1 cannot be avoided. Therefore, FG pulses P FG having the corresponding fluctuation are generated by frequency generator 2. Because counter 3 counts FG pulses P FG in a certain period to make count data D PC, the rotation fluctuation of dial 1 results in the fluctuation of count data D PC. For this reason, arithmetic processing unit 4 averages the count data D PC by integration calculation so that the fluctuation of count data D PC is eliminated.

Figure 2:
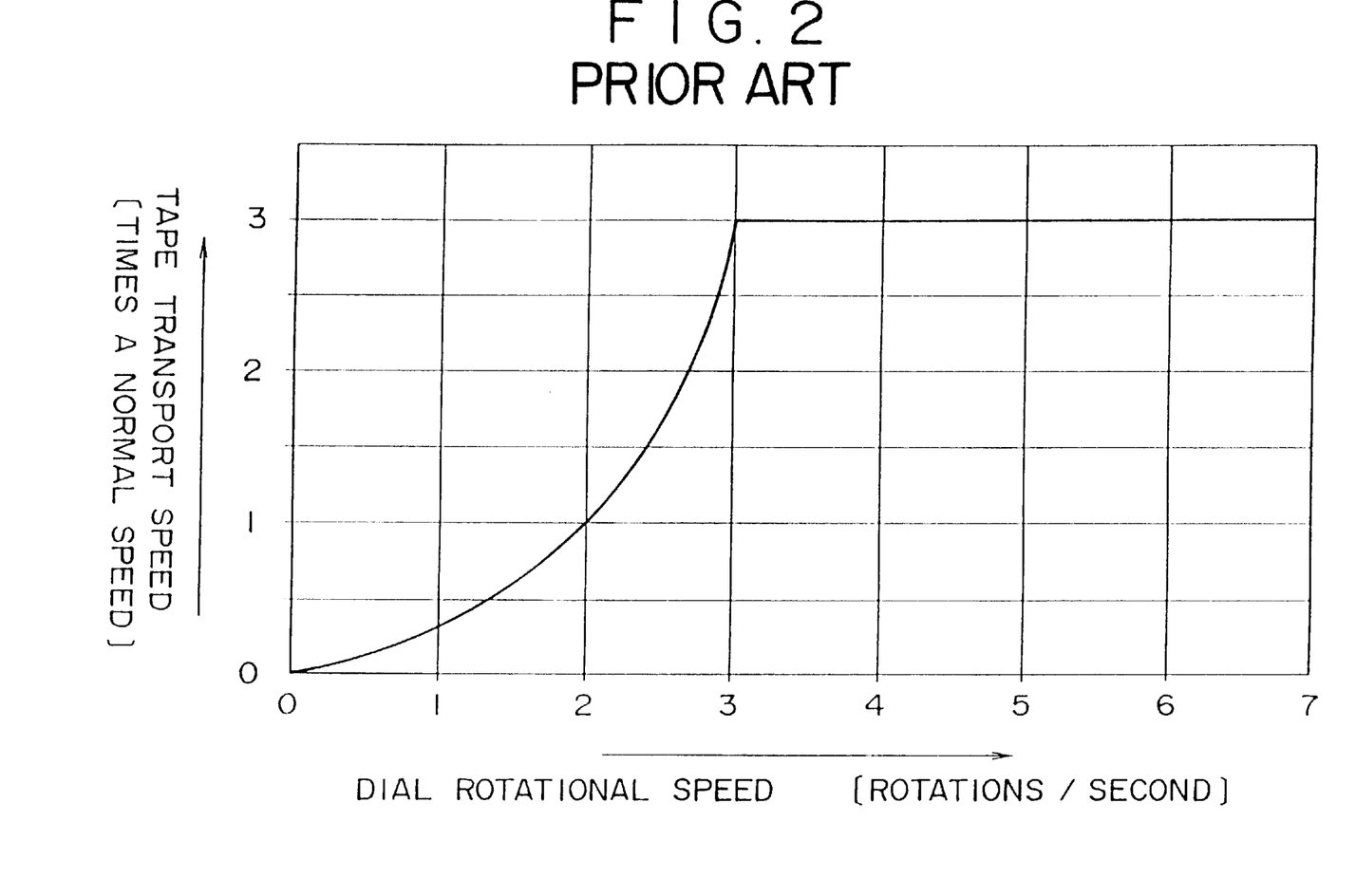
FIG. 2 shows a relationship between a dial rotational speed and a tape transport speed in prior art.

Count data D PCA averaged by arithmetic processing unit 4 is supplied to a tape transport speed command unit 5. Tape transport speed command unit 5 converts count data D PCA to a rotational speed of dial 1 and further converts it to a tape transport speed corresponding to the obtained rotational speed. To obtain the tape transport speed corresponding to the rotational speed, a table as shown in FIG. 2 is used, showing a relationship between a rotational speed of dial 1 and a tape transport speed. The table is stored, for example, in a ROM. FIG. 2 shows a relationship between a rotational speed of dial 1 in one direction and a tape transport speed. Although not shown in FIG. 2, when dial 1 is rotated in the other direction, a tape transport speed has a minus value.

Tape transport speed command unit 5 generates a command C SP to indicate a tape transport speed calculated in the above way. Command C SP is supplied to a tape transport system 6 so that a tape transport speed is controlled to be a speed indicated by command C SP.

Figure 3:
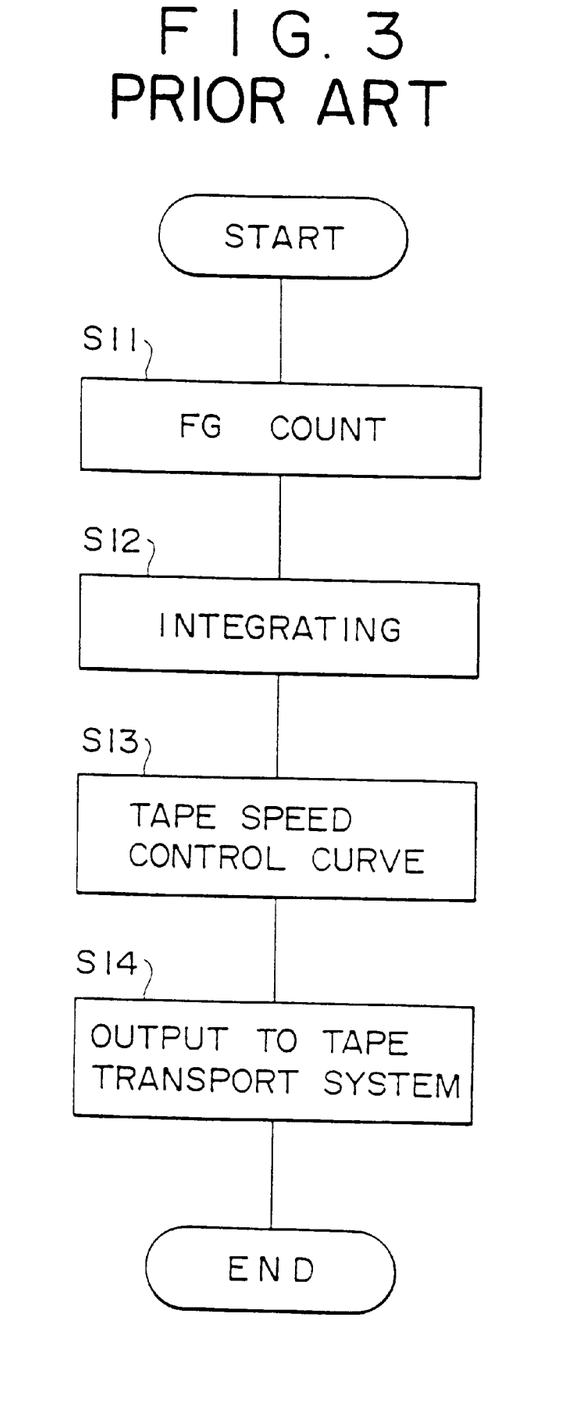
FIG. 3 is a flow-chart of processes of primary elements of a prior art apparatus.

FIG. 3 shows a flow-chart of processes of primary elements of the conventional apparatus as shown in FIG. 1. In FIG. 3, FG pulse P FG are counted in step S11, the count is integrated in step S12, command C SP is generated in step S13 based on the integral value and the tape speed control curve as shown in FIG. 2, and command C SP is supplied to tape transport system 6 in step S14.

According to an example as shown in FIG. 1, a table as shown in FIG. 2 is used such that when a rotational speed of dial 1 varies from 0 to 3 rotations per second, a tape transport speed simply varies from 0 to 3 times a normal speed. Because of the use of this table, a user needs to rotate dial 1 at a constant rotational speed in order to keep the constant tape transport speed in a range of 0 to 3 times a normal speed. It is very hard for the user to rotate dial 1 at a constant speed.

As explained above, in a conventional apparatus for controlling tape transport speed according to a rotational speed of dial 1, dial pulses (FG pulses PFG) may be averaged by some integral calculation. Tape transport system 6 is controlled according to command C SP based on the averaged pulse data (averaged count data D PCA).

However, when tape transport system 6 is controlled according to the averaged pulse data, a response of the tape transport speed control to the rotational speed of dial 1 is delayed due to the averaging process over the whole range of tape transport speeds to be controlled. Accordingly, an ease of use of the apparatus would be made worse.

On the other hand, if dial pulses (FG pulses P FG) are directly used without the integral calculation, fluctuation of the rotation of dial 1 would result in fluctuation of the tape speed.

OBJECT AND SUMMARY OF THE INVENTION

An object of the present invention is to provide a playback speed control system for stably keeping a constant playback speed.

Another object of the present invention is to provide a playback speed control system having a quick response characteristic.

Further object of the present invention is to provide a playback speed control system with little fluctuation of playback speed without degrading an ease of use.

In order to achieve the objects, an apparatus according to the present invention comprises a dial, rotational speed detecting means for detecting a rotational speed of the dial and playback speed commanding means for commanding a playback speed in accordance with the detect output of the rotational speed detecting means. The playback speed commanding means includes a table showing a relationship between a rotational speed of the dial and a playback speed. The table is made such that rotational speeds within a certain range correspond to a constant playback speed.

The output of the rotational speed detecting means is supplied to the playback speed commanding means directly or after being averaged. The apparatus comprises table content changing means for changing a content of the table in the playback speed commanding means.

Since rotational speeds within a certain range correspond to a constant playback speed, a constant playback speed is stably kept even if a rotational speed of the dial varies within that certain range.

When the detected output of the rotational speed detecting means is averaged and then, supplied to the playback speed commanding means, a response characteristic of the playback speed control becomes worse. But rotational fluctuation of the dial can be restrained. On the other hand, when the detected output of the rotational speed detecting means is directly supplied to the playback speed commanding means, rotational fluctuation of the dial cannot be restrained, but a response characteristic of the playback speed control becomes better. Because of the means for changing the content of the table, changing the playback speed to be kept stably can be easily changed.

A playback speed control system according to another aspect of the present invention comprises pulse generating means for generating pulses corresponding to the rotation of a dial, integrating means for comparing the number of the pulses generated by the pulse generating means with a reference value, for determining whether the pulse number is larger or smaller than the reference value and for integrating the pulse number generated by the pulse generating means when the pulse number is larger than the reference value and controlling means for providing information for the transport speed of the recording medium in accordance with the integrated pulse number obtained from the integrating means or the pulse number obtained from the pulse generating means, whereby the apparatus controls a recording medium transport system for transporting the recording medium so that a playback speed is controlled in accordance with the rotation of the dial.

Preferably, the reference value is set at a value which corresponds to less than a normal transport speed of the recording medium in a normal playback speed.

A playback speed control system according to another aspect of the present invention comprises pulse generating means for generating pulses corresponding to the rotation of a dial, integrating means for comparing the number of the pulses generated by the pulse generating means with plural reference values, for determining whether the pulse number is larger than, smaller than or between the plural reference values and for integrating the pulse number generated by the pulse generating means in several ways in accordance with the determination, and controlling means for providing information for the transport speed of the recording medium in accordance with the integrated pulse number obtained from the integrating means, whereby the apparatus controls a recording medium transport system for transporting the recording medium so that a playback speed is controlled in accordance with the rotation of the dial.

A magnetic tape can be one example of the recording medium which is used in the present invention. When a tape medium is used, a playback speed is equivalent to a tape transport speed. However, if a disc medium is used, a playback speed can be controlled by controlling track jumps in accordance with the rotation of the dial in a conventional way.

A playback speed control system according to the present invention controls a tape transport speed in accordance with the rotational speed of a jog dial. When the dial is rotated at low speed, dial FG pulses themselves are directly used as a pulse data in accordance with which the tape transport system is controlled. When the dial is rotated at high speed, the pulse data is obtained by integrating the dial FG pulses, using some FG arithmetic calculation. Then, the tape transport system is controlled in accordance with the pulse data so obtained. Therefore, during the low speed rotation of the dial, the response characteristic between the rotational speed of the dial and the tape transport speed will be improved. During the high speed rotation of the dial, fluctuation of the tape movement due to fluctuation of the dial rotation will be restrained.

In a playback speed control system according to the present invention, whether the integration of the pulse number should be carried out or not (or the degree of the integration of the pulse number) is determined, depending upon the rotational speed (the number of rotations) of the dial. For example, when a tape transport speed is equal to or slower than a normal speed, the pulse number is not integrated. Therefore, the responsive characteristic between the rotational speed of the dial and the tape transport speed can be improved because there is no response delay due to integrating the pulse number. On the other hand, when the tape transport speed is higher than a normal speed, the number of the pulses is integrated. Therefore, fluctuation of the tape movement due to fluctuation of the dial rotation is restrained.

DETAILED DESCRIPTION OF THE PREFERRED EMBODIMENT

Figure 4:
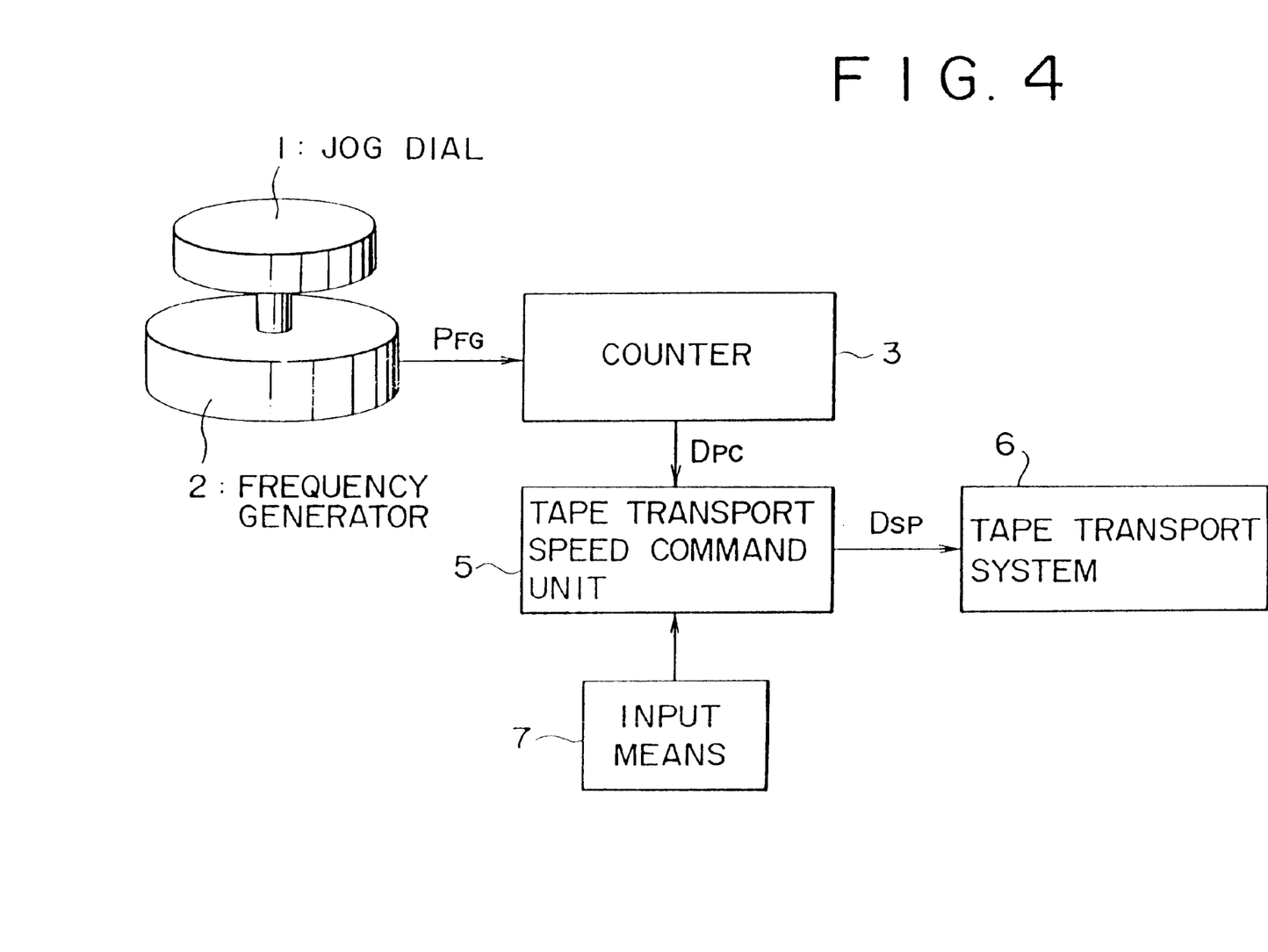
FIG. 4 is a block diagram showing a playback speed control system according to the present invention.

Referring to FIG. 4, one embodiment of the present invention will be described hereinafter. In the first embodiment, the present invention applies to a playback speed control system for a VCR. In FIG. 4, elements which have been already shown in FIG. 1 are referred to by the same reference numerals and explanation thereof will be omitted.

Figure 5:
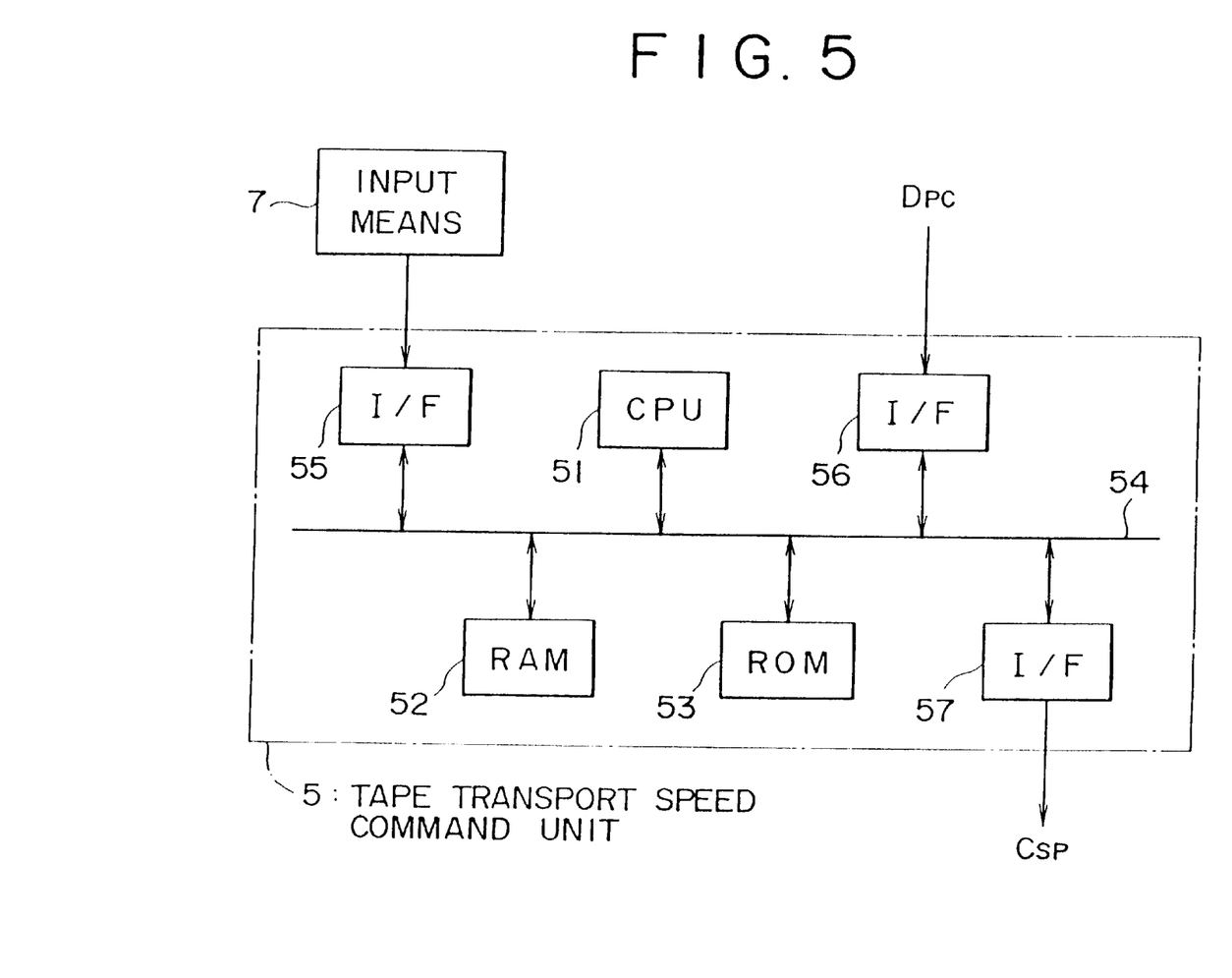
FIG. 5 is a block diagram showing a construction of a tape transport speed command unit used in the present invention.

In the first embodiment, count data D PC generated by counter 3 is directly supplied to a tape transport speed command unit 5. FIG. 5 shows an inside construction of tape transport speed command unit 5. Reference numerals 51, 52, 53, 54 and 55–57 are a CPU, a RAM, a ROM, a bus and interfaces, respectively.

Count data D PC is supplied from counter 3 through interface 56 to CPU 51. A command C SP indicating a tape transport speed is generated by CPU 51 and is supplied through interface 57 to a tape transport system 6.

Figure 6:
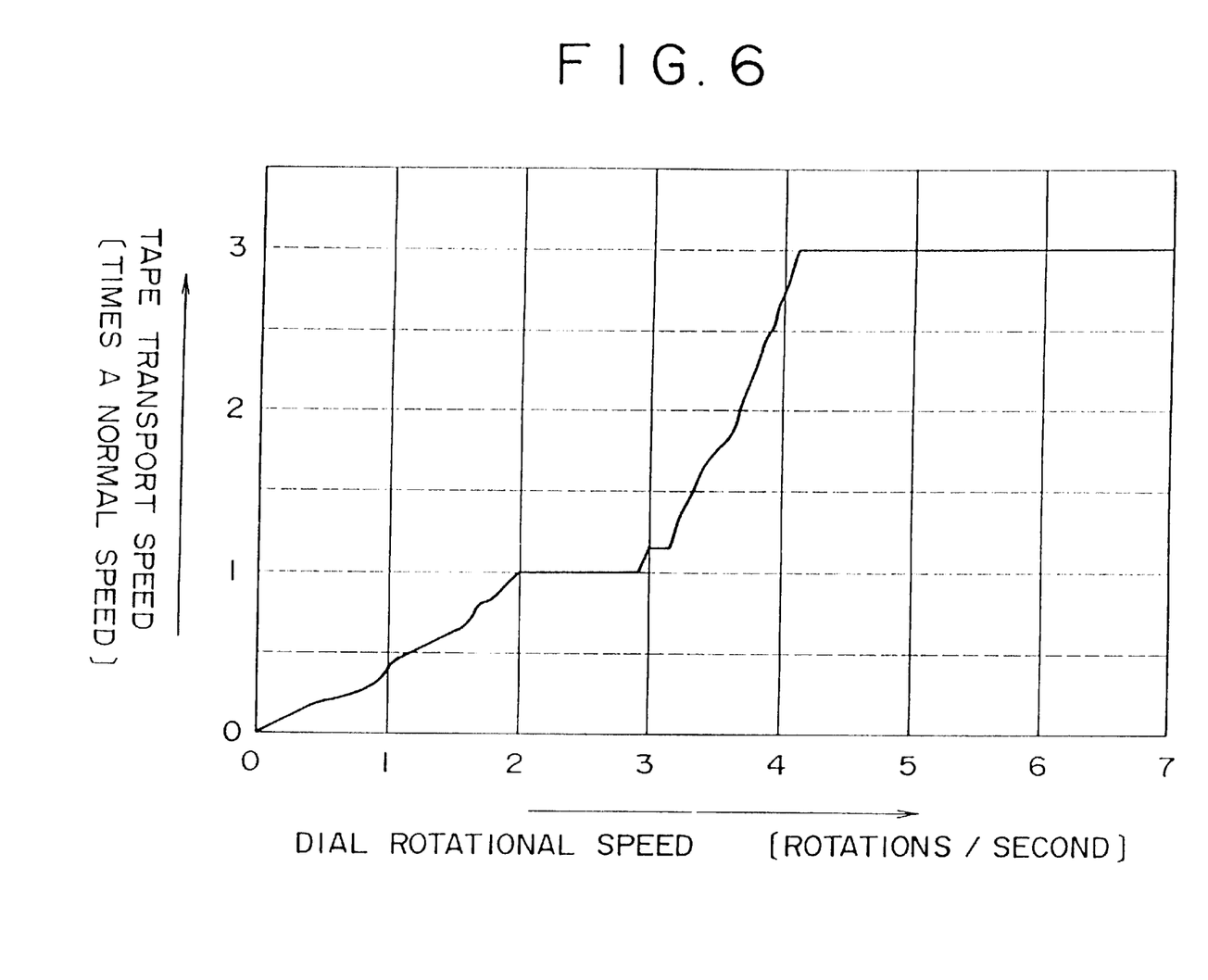
FIG. 6 shows a relationship between a dial rotational speed and a tape transport speed in the first embodiment of the present invention.

As shown in FIG. 6, ROM 53 stores a table to show a relationship between a rotational speed of dial 1 and a corresponding tape transport speed. When a rotational speed of dial 1 varies from 0 to 2 rotations per second, a corresponding tape transport speed varies from 0 to 1 time. Similarly, when a rotational speed of dial 1 varies from 3 to 4 rotations per second, a corresponding tape speed varies from 1 to 3 times a normal speed. When a rotational speed of dial 1 varies within a range of 2 to 3 rotations per second, a corresponding tape transport speed is kept constantly at a normal speed.

FIG. 6 only shows a relationship between a rotational speed of dial 1 in one direction and a tape transport speed. Although not shown in FIG. 6, when dial 1 is rotated in the other direction, a corresponding tape transport speed has a minus value.

Tape transport command unit 5 converts count data D PC to a rotational speed of dial 1 and further converts it to a tape transport speed corresponding to the obtained rotational speed. To obtain the tape transport speed corresponding to the rotational speed, the table as shown in FIG. 6 is used.

The table as shown in FIG. 6 may be stored in RAM 52 instead of ROM 53. In this case, as shown in FIG. 5, input means 7 such as a keyboard may be connected through interface 55 to CPU 51 so that the table stored in RAM 52 can be changed.

The first embodiment is constructed as explained above and other remaining elements are constructed in the same manner as shown in FIG. 1. In this embodiment, because the table in tape transport speed command unit 5 is such that a tape transport speed is constant at a normal speed when a rotational speed of dial 1 varies within a range of 2 to 3 rotations per second, playback speed command unit 5 continues to supply command C SP indicating a normal speed to tape transport system 6 so that the tape transport speed is stably kept at a normal speed, even if a user varies a rotational speed of dial 1 within a range of 2 to 3 rotations per second.

Because count data D PC generated by counter 3 is directly supplied to tape transport speed command unit 5, a response characteristic of controlling a tape transport speed becomes better than in a conventional system in which count data D PC is integrated and then, supplied to tape transport speed command unit 5.

Figure 7:
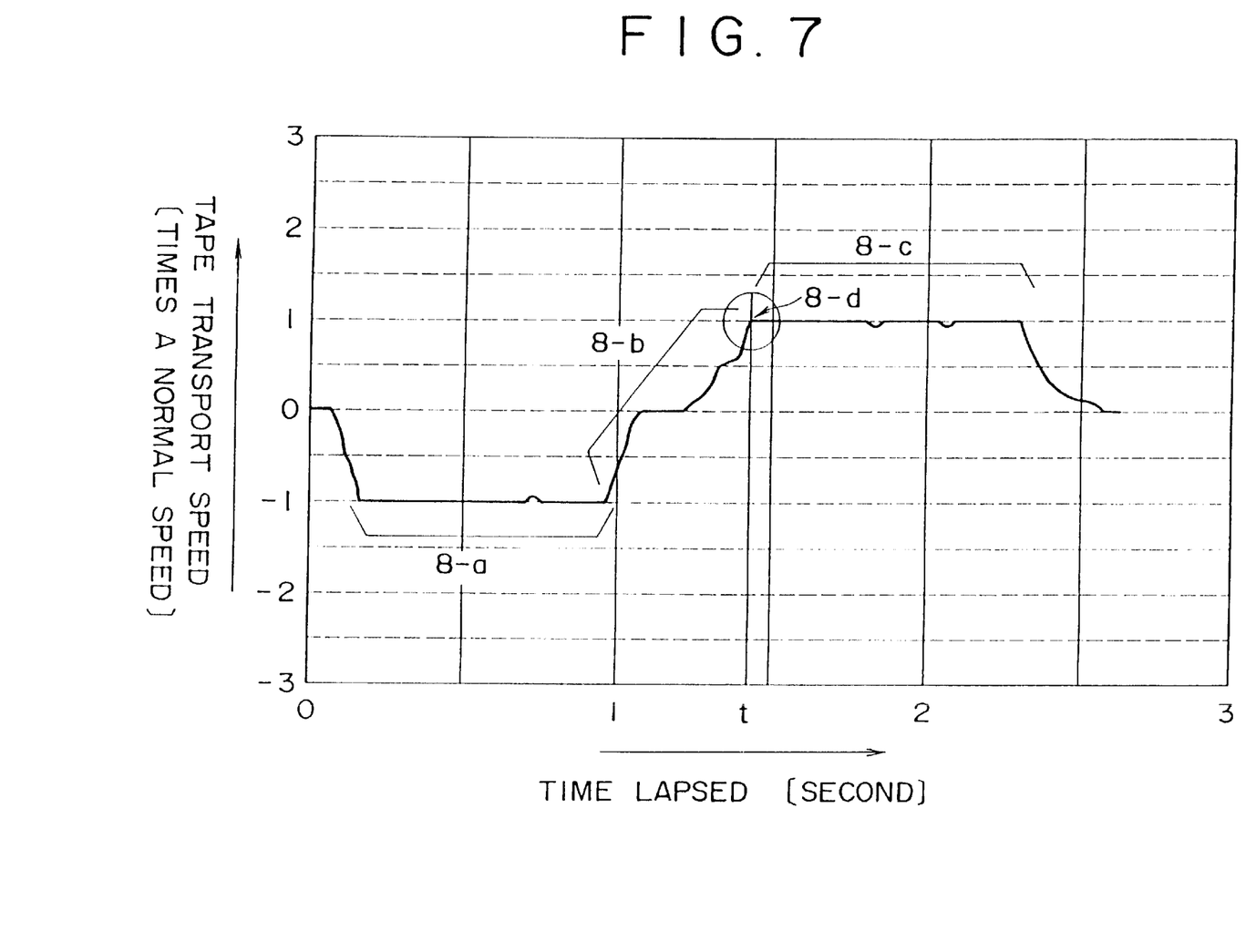
FIG. 7 shows a change of a tape transport speed as time runs in the first embodiment of the present invention.
Figure 8:
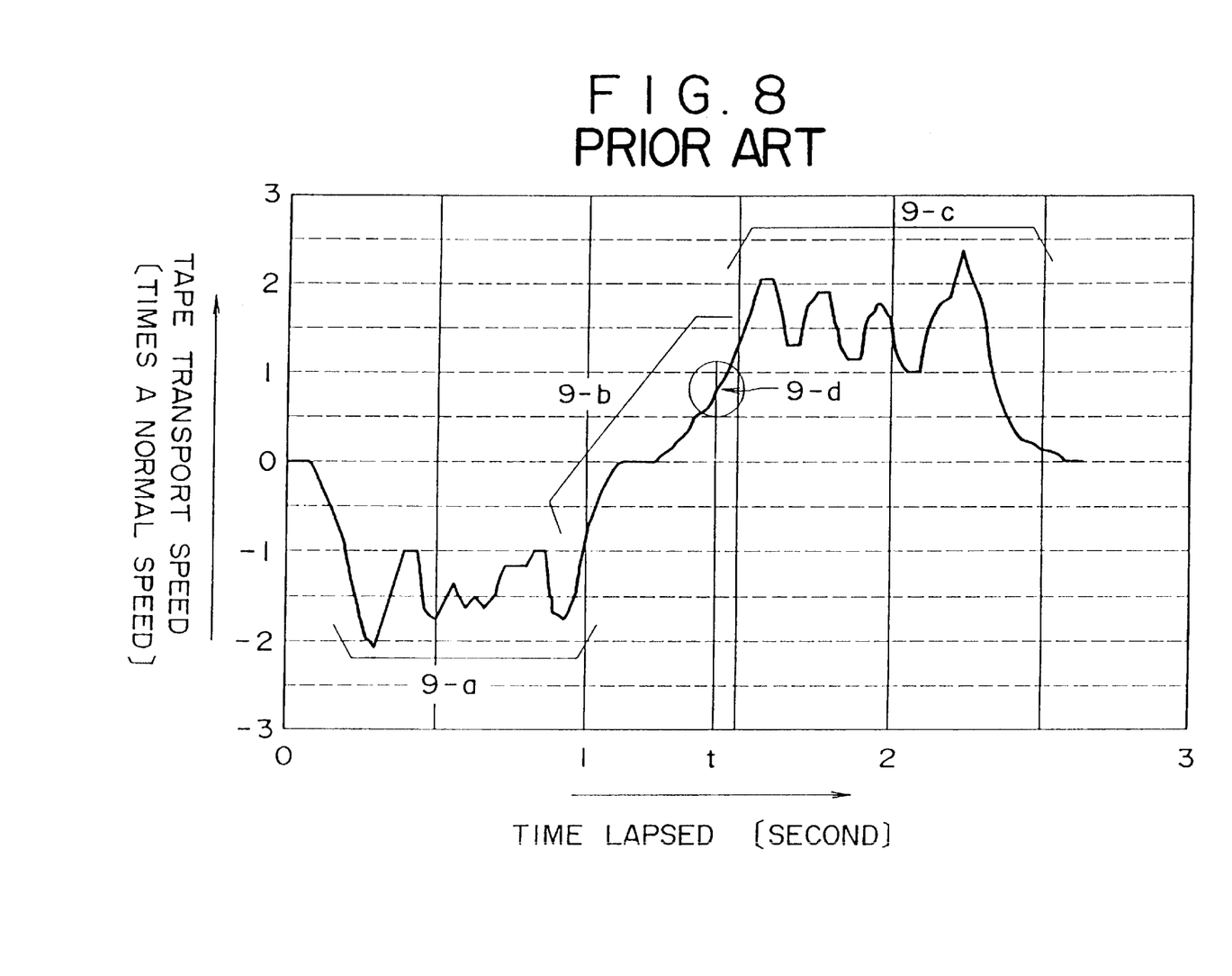
FIG. 8 shows a change of a tape transport speed as time runs in prior art.
Figure 9:
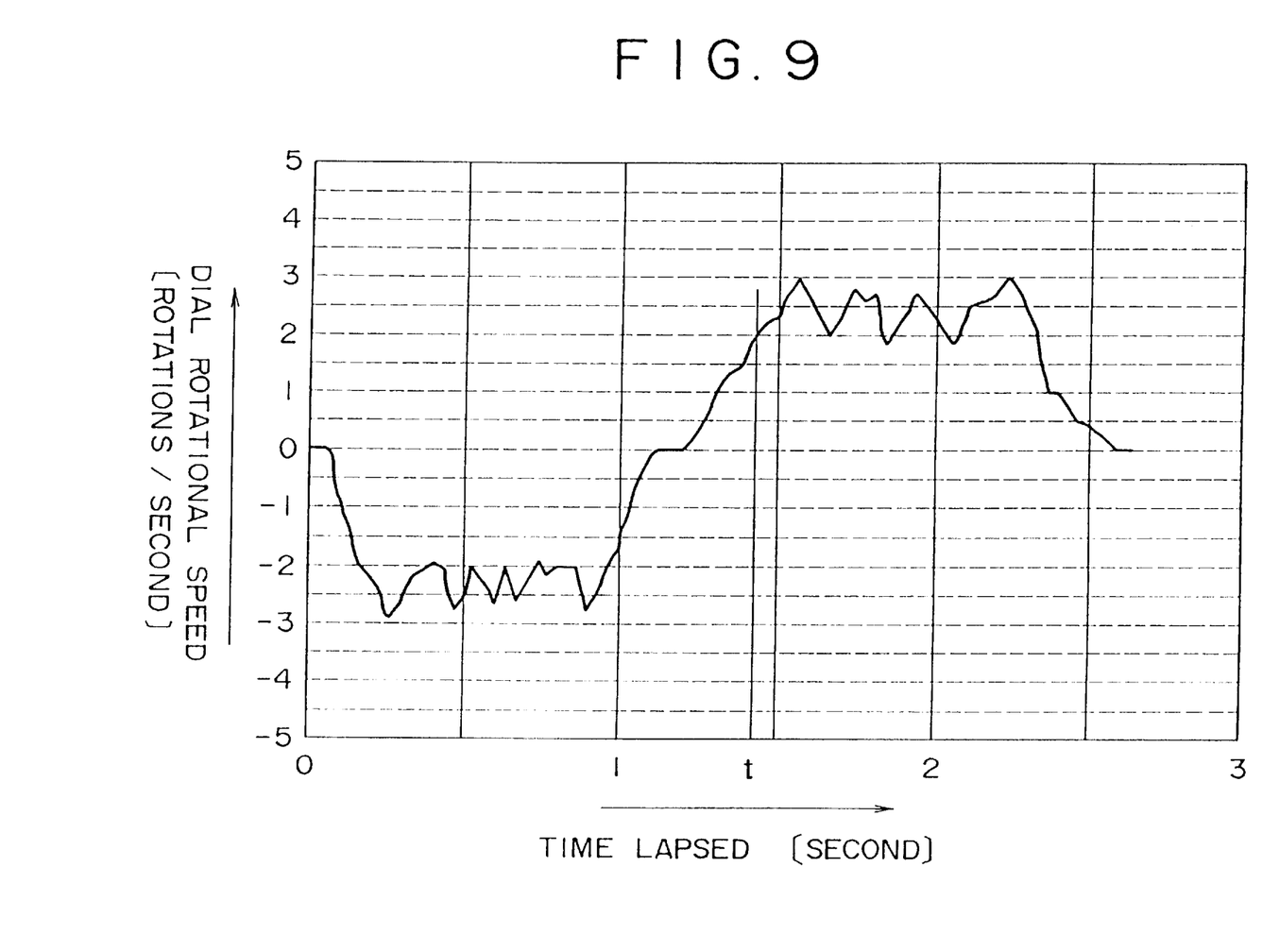
FIG. 9 shows an example of change of a dial rotational speed as time runs.

FIGS. 7 and 8 respectively show changes of a tape transport speed in the embodiment of the present invention and in a conventional system when a rotational speed of dial 1 varies as shown in FIG. 9.

Let us compare areas 8-$a$ and 8-$c$ in FIG. 7 with areas 9-$a$ and 9-$c$ in FIG. 8. A tape transport speed cannot be kept at a constant speed in the conventional system while a tape transport speed can be stably kept at +1 or −1 time a normal speed in the embodiment.

Let us compare a tape transport speed at time t in area 8-$b$ as shown in FIG. 7 with that of area 9-$b$ as shown in FIG. 8. Because a rotational speed of dial 1 at time t is 2 rotations per second as shown in FIG. 9, a tape speed at time t should be a normal speed both in the conventional system and in the embodiment, referring to FIGS. 2 and 6, respectively. However, a tape speed at time t does not reach a normal speed in the conventional system (see area 9-$d$ in FIG. 8) while a tape speed at time t is a normal speed in the embodiment of the invention (see area 8-$d$ in FIG. 7). Because of this, it is noted that a response characteristic of a tape transport speed control is better in the embodiment than in the conventional system.

By using a table stored in RAM 52 and changing its content by input means 7, the tape transport speed can be kept constant over any desired range of dial rotational speeds. For example, in FIG. 6, a tape transport speed is kept constantly at a normal speed when a rotational speed of dial 1 varies within a range of 2 to 3 rotations per second. However, a tape speed can be kept constantly at any speed when a rotational speed of dial 1 varies within any other range.

In the embodiment as shown in FIG. 4, since count data D PC generated by counter 3 is directly, without being integrated, supplied to tape transport speed command unit 5, a response characteristic of the tape speed control is improved, but a rotational fluctuation of dial 1 cannot be restrained. In the alternative, count data D PC generated by counter 3 could be averaged and then, be supplied to tape transport speed command unit 5 so that the first priority can be put on restraint of rotational fluctuation of dial 1.

Although the present invention applies to a playback speed control system for a VCR in the above embodiment, a playback speed control system according to the present invention may apply to a reproducing apparatus using another type of recording medium such as a disk.

According to the first embodiment of the present invention, because a table in the tape transport speed commanding means is made such that rotational speeds in a certain range corresponds to a constant playback speed, the tape transport speed commanding means continues to supply a command to keep a constant speed, even if the rotation of the dial varies within the certain range.

By averaging the detect output of the rotational speed detecting means and supplying it to the tape transport speed commanding means, a response characteristic of playback speed control becomes worse, but rotational fluctuation of the dial can be restrained. On the other hand, by directly supplying the detect output of the rotational speed detecting means to the playback speed commanding means, a rotational fluctuation of the dial cannot be restrained, but a response characteristic of playback speed control becomes better.

By providing means for changing the content of the table in the playback speed means, a playback speed to be kept stable can be easily changed.

Next, another embodiment of a playback speed control system according to the invention will be explained, referring to drawings.

In the second embodiment, ROM 53 stores a table as shown in FIG. 2 as used in the conventional system. The table shows a relationship between a rotational speed of dial 1 and a corresponding tape transport speed so that the tape speed corresponding to the rotational speed of dial 1 can be obtained. When a rotational speed of dial 1 varies from 0 to 3 rotations per second, a corresponding tape transport speed also simply varies from 0 to 3 times a normal speed. When dial 1 rotates in the other direction, a tape speed has a minus value.

A table as shown on FIG. 2 can be stored in RAM 52 instead of ROM 53. In this alternative, an input means 7 such as an keyboard in FIG. 5 can be connected through interface 55 to CPU 51 so that the table stored in RAM 52 may be changeable.

Tape transport speed command unit 5 in the second embodiment outputs a tape transport speed in accordance with a rotational speed of dial 1, compares count data D PC from counter 3 with a reference value and determines whether count data D PC is larger than the reference value. When count data D PC is larger than the reference value, tape transport speed command unit 5 integrates count data D PC and uses the result of the integrating in order to generate command D SP providing a tape transport speed. When count data D PC is not larger than the reference value, tape transport speed command unit 5 simply uses count data D PC as command D SP and send it to tape transport system 6.

A value corresponding to a normal tape transport speed is used as the reference value in tape transport speed command unit 5. Therefore, tape transport speed command unit 5 determines whether count data D PC from counter 3 is larger than the value corresponding to the normal tape transport speed (the reference value). When tape transport speed command unit 5 determines that count data D PC is larger than the reference value, it integrates count data D PC and supplies to tape transport system 6 command D SP obtained after the integration calculation. When tape transport speed command unit 5 determines that count data D PC is not larger than the reference value, it supplies count data D PC (without being integrated) as command D SP to tape transport system 6.

Figure 10:
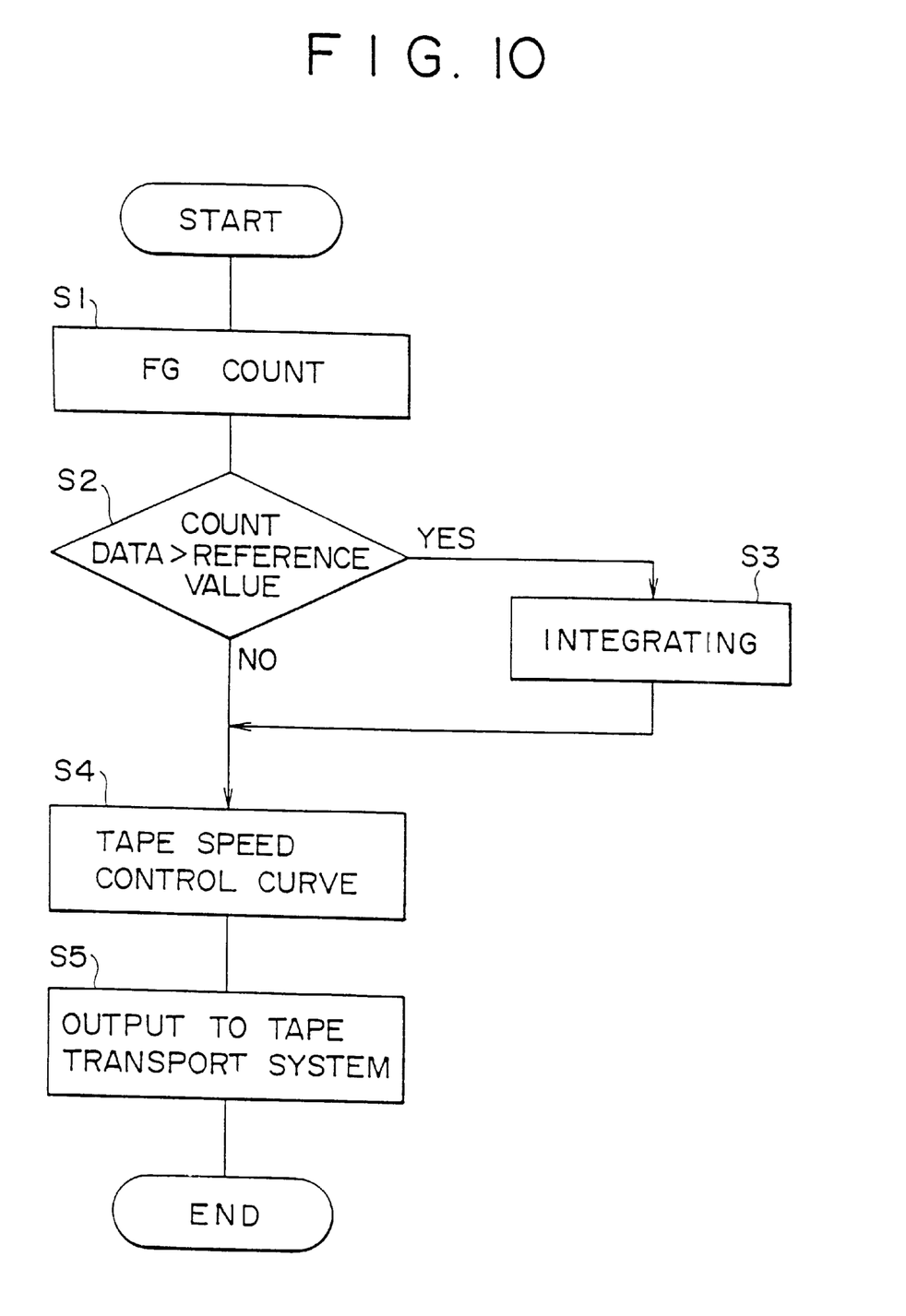
FIG. 10 is a flow-chart of processes of primary elements of one embodiment of the present invention.

FIG. 10 shows a flow-chart of processes of primary elements of the apparatus as shown in FIGS. 4 and 5. In FIG.

10, FG pulses P FG is counted in step S1, the determination whether count data D PC is larger than the references values is made in step S2. If it is determined in step S2 that count data D PC is larger than the reference value (in case of "Yes" determination), count data D PC is integrated in step S3, and then, step S4 is carried out. If it is determined in step S2 that count data D PC is not larger than the references value(in case of "No" determination), step S4 is immediately carried out, skipping step S3. In step S4, command D SP is generated in accordance with a tape speed control curve as shown in FIG. 2. Then, in step S5, command D SP is sent to tape transport system 6.

In the apparatus according to the second embodiment, when a tape is controlled to be transported at a slow speed such as a normal (1 time) speed, dial 1 also rotates slowly so that count data D PC is not larger than the reference value. In this case, integration calculation is not carried out on count data D PC. Command D SP is obtained from the tape speed control curve, using unprocessed count data D PC and command D SP is supplied to tape transport system 6. Accordingly, a tape transport control can be done without a response delay due to the integration calculation. In a prior art system, because an integration calculation is always carried out on count data D PC as shown in FIG. 6, a response of tape transport speed control command to the rotation of the dial is delayed when the tape is transported at a slow speed.

On the other hand, when the tape is controlled to be transported at a high speed, count data D PC is larger than the references value so that the integration calculation is carried out on count data D PC. Because of the integration calculation, fluctuation of count data D PC due to rotational fluctuation of dial 1 is restrained. Command D SP is obtained from the tape speed control curve, using count data D PC with restrained fluctuation and is supplied to tape transport system 6. Accordingly, a tape transport control can be done with restrained fluctuation.

Although the reference value is set at 2 rotations per second of dial 1 (1 time a normal tape speed) as shown in FIG. 2 in the second embodiment, the reference value can be set at any other rotational speed of dial 1 (any other tape speed), without limiting it to this particular embodiment.

According to the second embodiment as described above, in a high tape speed range in which a smoother response of tape transport speed is required with respect to rotational speed of dial 1, rotational fluctuation of dial 1 is restrained by the integration calculation. In a slow tape speed range in which a quicker response of tape transport speed is required, a response characteristic is improved because no integration calculation is carried out. Therefore, an operational response in a whole range of tape transport speed is improved.

As explained above, in a recording medium transport speed control apparatus according to the second embodiment of present invention, a pulse count data generated corresponding to the dial rotation is compared with a reference value and the pulse count data is integrated when the pulse count data is larger than the reference value. Because a playback speed is controlled in accordance with the pulse count data, a playback speed control can be achieved with a restrained fluctuation of tape transport and without sacrificing an ease of use of the apparatus.

Although the second embodiment as explained above uses a single reference value to compare with count data D PC, plural reference values may be used so that suitable one of different integration calculations are selected in accordance with the comparison result of count data D PC with each reference value.

In an apparatus according to the third embodiment, tape transport speed command unit 5 comprises comparing means for comparing count data D PC with plural reference values, integrating means for determining whether count data D PC is larger than, smaller than or between each of the plural reference values and for processing count data D PC using a different integration calculation depending upon the comparison result, and determining means for determining a tape transport speed of a magnetic tape in accordance with the integration value supplied from the integrating means. Then, tape transport system for transporting the magnetic tape is controlled in accordance with command D SP providing a tape transport speed of the magnetic tape which is determined by tape transport speed command unit 5. Since the comparing means, the integrating means and the determining means are included in CPU 51 as shown in FIG. 5, they are not shown particularly in the figures.

Tape transport speed command unit 5 according to the third embodiment is provided with n reference values. Any three reference values m−1, m, m+1 are selected among the n reference values. Tape transport speed command unit 5 determines whether count data D PC is not larger than (or smaller than) the reference value m−1, whether count data D PC is larger than (or not smaller than) the reference value m−1 but not larger than (or smaller than) the reference value m, or whether count data D PC is larger than (or not smaller than) the reference value m but not larger than (or smaller than) the reference value m+1. Then, tape transport speed command unit 15 chooses one of the different tape transport speeds calculated by different integrations. Tape transport speed command unit 15 chooses the best one based upon the above comparison determination and supplies to tape transport system 6 command D SP corresponding to the determined tape transport speed.

In the above third embodiment, a finer control of the tape transport speed can be achieved depending upon the dial rotational speed.

What is claimed is:

1. A playback speed control system for a reproducing apparatus comprising:

a dial;

rotational speed detecting means for detecting a rotational speed of said dial and generating an output signal; and playback speed controlling means for controlling a playback speed in accordance with the output signal of said rotational speed detecting means, said playback speed controlling means comprising:

memory means for storing a table whose contents represent a relationship between a rotational speed of said dial and a corresponding playback speed, wherein rotational speeds of said dial within a certain range correspond to a constant playback speed; and table changing means for changing the contents of said table stored in said memory means, said table changing means comprising user operated input means for supplying said changed contents of said table to said memory means.

2. A playback speed control system according to claim 1, further comprising: averaging means for averaging the output signal of said rotational speed detecting means and for supplying the averaged output signal to said playback speed controlling means.

3. A playback speed control system according to claim 1, wherein the output signal of said rotational speed detecting means is directly supplied to said playback speed controlling means.

4. A playback speed control system according to claim 1, wherein a tape is used as a recording medium from which signals are reproduced at the playback speed.

5. A playback speed control system according to claim 4, further comprising: tape transporting means in response to said controlling means, for transporting said tape at a transport speed corresponding to said playback speed.

6. A playback speed control system for a reproducing apparatus comprising:

a dial;

rotational speed detecting means for detecting a rotational speed of said dial and generating an output signal;

comparing means for comparing the output signal of said rotational speed detecting means with a reference speed and for determining whether the rotational speed is higher than the reference speed;

averaging means for averaging the output signal of said rotational speed detecting means only when said comparing means determines that the rotational speed is higher than the reference speed; and controlling means for controlling a playback speed in accordance with the averaged output signal from said averaging means when said rotational speed is higher than said reference speed or directly in accordance with the non-averaged output signal from said rotational speed detecting means, when said rotational speed is less than or equal to said reference speed.

7. A playback speed control system according to claim 6, wherein said reference speed is less than a normal playback speed.

8. A playback speed control system according to claim 6, wherein a tape is used as a recording medium from which signals are reproduced at the playback speed.

9. A playback speed control system according to claim 8, further comprising: tape transporting means in response to said controlling means, for transporting said tape at a transport speed corresponding to said playback speed.

10. A playback speed control system according to claim 6, wherein said rotational speed detecting means includes pulse generating means for generating pulses in accordance with the rotations of said dial.

11. A playback speed control system according to claim 10, wherein said comparing means compares the number of the pulses generated by said pulse generating means with a reference value corresponding to said reference speed and determines whether the number of the pulses is larger than the reference value.

12. A playback speed control system according to claim 11, wherein said averaging means includes integrating means for integrating the number of the pulses generated by said pulse generating means when said comparing means determines that the number of the pulses is larger than the reference value.

13. A playback speed control system for a reproducing apparatus comprising:

a dial;

rotational speed detecting means for detecting a rotational speed of said dial and generating an output signal;

comparing means for comparing the output signal of said rotational speed detecting means with plural reference speeds and for determining whether the rotational speed is higher than, smaller than or between the plural reference speeds, wherein said plural reference speeds define a plurality of ranges and each range corresponds to a particular integration calculation;

averaging means for averaging the output signal of said rotational speed detecting means in accordance with the integration calculation corresponding to the determination by said comparing means; and controlling means for controlling a playback speed in accordance with the averaged output signal from said averaging means.

14. A playback speed control system according to claim 13, wherein a tape is used as a recording medium from which signals are reproduced at the playback speed.

15. A playback speed control system according to claim 14, further comprising: tape transporting means in response to said controlling means, for transporting said tape at a transport speed corresponding to said playback speed.

16. A playback speed control system according to claim 13, wherein said rotational speed detecting means includes pulse generating means for generating pulses in accordance with the rotations of said dial.

17. A playback speed control system according to claim 16, wherein said comparing means compares the number of the pulses generated by said pulse generating means with a reference value corresponding to one of said plural reference speeds and determines whether the number of the pulses is larger than the reference value.

18. A playback speed control system according to claim 17, wherein said averaging means includes integrating means for integrating the number of the pulses generated by said pulse generating means when said comparing means determines that the number of the pulses is larger than the reference value.

* * * * *